Sept. 14, 1954      R. H. BARNES      2,688,876

TEMPERATURE MEASURING DEVICE

Filed Aug. 15, 1952

INVENTOR.
Robert H. Barnes,
BY
McMorrow, Berman & Davidson
ATTORNEYS.

Patented Sept. 14, 1954

2,688,876

UNITED STATES PATENT OFFICE 2,688,876

TEMPERATURE MEASURING DEVICE

Robert H. Barnes, Ozone Park, N. Y.

Application August 15, 1952, Serial No. 304,555

3 Claims. (Cl. 73—343)

This invention relates to measuring devices, and more particularly, has reference to a device adapted to measure temperature, the invention being directed to the provision of a temperature measuring device of a portable nature, adapted to be detachably connected directly to a surface, the temperature of which is to be found.

In many instances, it is desirable to measure the temperature of a particular surface or object, under circumstances which make it difficult to use a conventional thermometer or equivalent temperature measuring device. For example, in many instances it is desired to check the temperature of a motor while the motor is running, and it will be readily appreciated that an ordinary motor or engine has no means associated therewith which permits the ready attachment of a thermometer or equivalent measuring device to said motor or engine.

In view of the above, it is the main object of the present invention to provide a temperature measuring device which will be particularly adapted for detachable connection, in minimum time and with maximum ease, to a surface, such as the wall of a motor, the temperature of which is to be measured.

Another object of importance is to provide a device of the type stated which will remain securely connected to the surface, until such time as the measuring device is to be removed.

Another object of importance is to provide a temperature measuring device as stated which can be manufactured at relatively low cost, will be rugged, and substantially trouble free in operation.

Yet another object is to provide a portable temperature measuring device which will include a hollow base adapted to contain a quantity of a fluid having good heat transfer properties, which base will be integrally formed with a suction cup whereby the base can be quickly attached to an engine block or the like.

Still another object is to provide a temperature measuring device as stated wherein the base will have associated therewith a thermometer, one end of the thermometer extending within the hollow base to a location below the level of said heat transfer fluid, thus to permit the temperature of the fluid to be transferred readily and in minimum time to the body of the thermometer.

Other objects will appear from the following description, the claims appended thereto, and from the annexed drawing, in which like reference characters designate like parts throughout the several views, and wherein:

Figure 1:
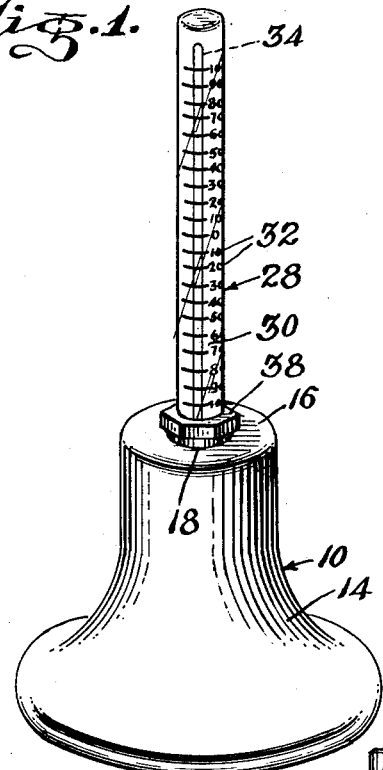
Figure 1 is a perspective view of a temperature measuring device formed in accordance with the present invention.

Referring to the drawings in detail, the reference numeral 10 has been applied generally to a base. The base 10, which has been illustrated in Figures 1–3, is integrally molded or otherwise formed from soft rubber or other resilient material, the base having a flared or bell shape.

Figure 2:
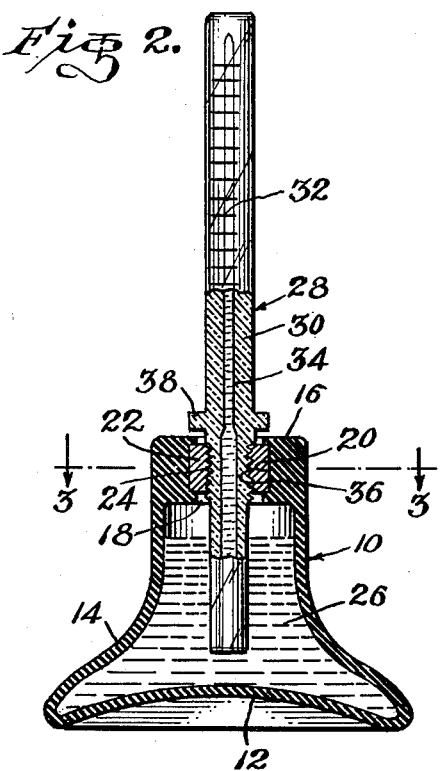
Figure 2 is a longitudinal sectional view.
Figure 3:
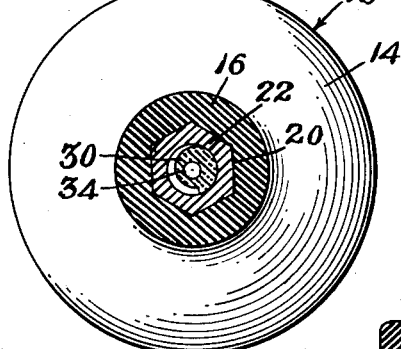
Figure 3 is a transverse sectional view, taken substantially on line 3—3 of Figure 2.

The base 10 is integrally formed with a bottom or outer end wall 12, said outer end wall being disposed at the larger end of the base and being of concavo convex formation, as may be readily noted from Figure 2. The end wall 12 defines a suction cup upon the outer end of the base, said suction cup being formed as an integral part of the base and being adapted to permit connection of the base to any surface, the temperature of which is to be measured, and which is sufficiently flat to allow adherence of the suction cup thereto. Thus, the base could, for example, be attached to the wall of an internal combustion engine or the like, for the purpose of measuring the temperature at which the engine is running.

Integral with the periphery of the end wall 12 is a side wall 14, said side wall being flared, thus to taper the side wall toward the inner or smaller end of the base. At the smaller end of the base, the base has a relatively thick inner end wall 16, formed with a center opening 18. The center opening 18, intermediate its opposite ends, is provided with a recess 20 of non-circular cross section (see Figure 3). The cross sectional shape of the recess 20 formed in the wall of the opening 18 can be varied as desired, but in the present instance the recess 20 is of hexagonal cross section, to receive a complementarily formed nut or bushing 22, embedded in the end wall 16. The bushing 22 has an internally threaded center opening 24.

Substantially filling the hollow interior of the base 10 is a quantity of a liquid 26, said liquid being of a type that will transfer heat readily. As will be noted, the liquid does not completely fill the hollow interior of the base, the level of the liquid being spaced below the end wall 16 to provide an area within which the liquid may expand.

The side wall 14 between the inner end wall 16 and the end wall 12 itself are of relatively thin resilient material of such thickness that the conductivity of the walls 12 and 14 will not appreciably hinder the transfer of heat from the surface to which the end wall 12 is attached and the liquid 26 in the hollow interior of the base 10.

A thermometer has been designated generally by the reference numeral 28, and is generally conventional so far as the operating characteristics thereof are concerned. The thermometer 28 includes a closed, elongated envelope 30, of glass or similar material, said envelope 30 having a portion disposed exteriorly of the base and provided with suitable calibrations 32.

Formed upon the envelope 30, intermediate the opposite ends of said envelope, are external threads 36, engageable with the threads of the center opening of the bushing 24. Immediately above the threads 36 of the thermometer, the envelope is integrally formed with a circumferential collar 38 of non-circular formation. The collar 38, in the present instance, is hexagonally formed, to permit said collar to receive a wrench or similar tool, whereby the thermometer can be tightly engaged with the bushing 24.

The bottom end of the thermometer extends downwardly within the interior of the base, and in the form of the invention illustrated in Figures 1 to 3, inclusive, said bottom end of the thermometer is immerged directly within the liquid 26.

Figure 4:
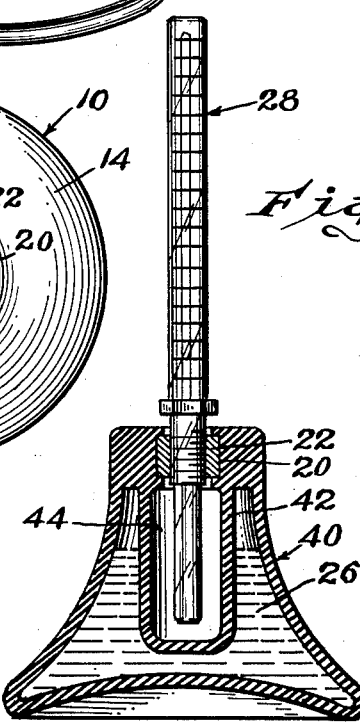
Figure 4 is a view similar to Figure 2, showing a modified form.

In the form of the invention illustrated in Figure 4, the thermometer 28 is identical to the thermometer illustrated in Figure 2. Similarly, the bushing 22 is formed like the bushing shown in the first form of the invention.

The base, however, is slightly different from that shown in Figure 2, and has been designated by the reference numeral 40. The base 40 is molded integrally from soft rubber or similar material, and so far as its outer appearance is concerned, is identical to the base 10, thus to define a suction cup on the outer end of the base whereby the same can be attached to the surface of a motor or the like, not shown.

Formed integrally as a part of the base is a cup-shaped partition 42, extending below the level of the liquid 26, said cup-shaped partition being integral, at its upper end, with the inner surface of the upper end wall of the base 40. There is thus defined, within the base, a separate chamber 44, into which the lower end of the thermometer 28 extends.

Thus, in the form of the invention illustrated in Figure 4, the thermometer does not extend directly into the liquid 26, being positioned instead, in a heat transfer chamber 44 separated from the liquid by the wall of the partition 42.

Both forms of the invention have in common, however, a characteristic wherein the bottom end of the thermometer extends below the level of the liquid 26, and thus, when the liquid 26 is heated by transfer of heat through the suction cup 12, the thermometer will act responsively to elevation of the temperature of the liquid, thus to show the temperature of the surface to which the suction cup is attached.

It is considered to be an important characteristic of the invention that the base is integrally formed in such a way as to define not only a receptacle for a heat transfer liquid and a support for the thermometer acting responsively to the temperature of said liquid, but also to define, as an integral part of the base, a suction cup whereby the entire device can be readily attached to any flat surface the temperature of which is to be measured. The thickness of the surface contacting portion of the base being such that the liquid will not be insulated from the surface contacted by the base.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A temperature measuring device adapted to indicate the temperature of a surface comprising, a hollow base having a concavo-convex end portion formed as a suction cup for attaching the base to contact the surface the temperature of which is to be measured, a liquid having good heat transfer properties contained in said base whereby the heat of the surface may be transferred from the surface to the liquid contained in said base, the surface contacting end portion of said base being relatively thin so as not to appreciably hinder the transfer of heat from said surface to said liquid, and a thermometer carried by said base at a location remote from said end portion and extending into said base to a location below the surface of said liquid to indicate the amount of heat transferred from said surface to said liquid.

2. A temperature measuring device adapted to indicate the temperature of a surface comprising, a hollow base of flexible material having a concavo-convex end wall formed as a suction cup for attaching the base to contact the surface the temperature of which is to be measured and a side wall integrally molded with said end wall, the end of the side wall remote from said end wall having a relatively thick inner end wall through which an opening extends, a liquid having good heat transfer properties contained in said base whereby the heat of said surface may be transferred to said liquid, said surface contacting end wall of said base being of such thickness so as not to appreciably hinder the transfer of heat from said surface to said liquid, and an elongated glass thermometer carried by said inner end wall and extending through the opening in said inner end wall into said base to a location below the surface of said liquid to indicate the amount of heat transferred from said surface to said liquid.

3. A temperature measuring device adapted to indicate the temperature of a surface comprising, a hollow base of flexible material having a concavo-convex end wall formed as a suction cup for attaching the base to contact the surface the temperature of which is to be measured and a side wall integrally molded with said end wall, the end of the side wall remote from said end wall having a relatively thick inner end wall through which an opening extends, a liquid having good heat transfer properties contained in said base whereby the heat of said surface may be transferred to said liquid, a partition formed as an integral part of said base, said partition being of cup shape and extending into the hollow of said base and below the surface of the liquid contained in said base, the open end of said cup-shaped partition communicating with the opening in said inner end wall to form a separate chamber within the base, and an elongated glass thermometer carried by said inner end wall and having one end extending through the opening in said inner end wall and into said chamber, to a location below the level of the liquid contained in said base to indicate the amount of heat transferred from said surface to said liquid.

References Cited in the file of this patent

UNITED STATES PATENTS

| Number | Name | Date |
|---|---|---|
| 1,478,084 | Whittington | Dec. 18, 1923 |
| 1,575,262 | Greiner, Jr. | Mar. 2, 1926 |
| 2,048,512 | Oakley | July 21, 1936 |
| 2,139,805 | Chase | Dec. 13, 1938 |
| 2,282,277 | Whittier | May 5, 1942 |